(12) United States Patent
Navarrete Michelini et al.

(10) Patent No.: US 10,019,642 B1
(45) Date of Patent: Jul. 10, 2018

(54) IMAGE UPSAMPLING SYSTEM, TRAINING METHOD THEREOF AND IMAGE UPSAMPLING METHOD

(71) Applicant: BOE TECHNOLOGY GROUP CO., LTD., Beijing (CN)

(72) Inventors: Pablo Navarrete Michelini, Beijing (CN); Lijie Zhang, Beijing (CN); Jianmin He, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/518,404

(22) PCT Filed: Mar. 2, 2016

(86) PCT No.: PCT/CN2016/075338
§ 371 (c)(1),
(2) Date: Apr. 11, 2017

(87) PCT Pub. No.: WO2017/045374
PCT Pub. Date: Mar. 23, 2017

(30) Foreign Application Priority Data

Sep. 17, 2015 (CN) .......................... 2015 1 0595656

(51) Int. Cl.
*G06K 9/46* (2006.01)
*G06N 3/04* (2006.01)
(Continued)

(52) U.S. Cl.
CPC ......... *G06K 9/4628* (2013.01); *G06K 9/6289* (2013.01); *G06N 3/04* (2013.01); *G06N 3/08* (2013.01); *G06T 3/40* (2013.01)

(58) Field of Classification Search
CPC combination set(s) only.
See application file for complete search history.

(56) References Cited

U.S. PATENT DOCUMENTS 4,416,288 A * 11/1983 Freeman ............... A61B 5/0476
600/544
5,138,695 A * 8/1992 Means ..................... G06K 9/56
382/156
(Continued)

FOREIGN PATENT DOCUMENTS

| CN | 101639937 A | 2/2010 |
| CN | 105120130 A | 12/2015 |
| CN | 204948182 U | 1/2016 |

OTHER PUBLICATIONS

International Search Report for PCT/CN2016/075338 in Chinese, dated May 19, 2016 with English translation.
(Continued)

*Primary Examiner* — Anand Bhatnagar
(74) *Attorney, Agent, or Firm* — Collard & Roe, P.C.

(57) ABSTRACT

An image upsampling system, a training method thereof and an image upsampling method are provided, the feature images of an image are obtained by using the convolutional network, upsampling processing is performed on the images with the muxer layer to synthesize every n×n feature images in the input signal into a feature image with the resolution amplified by n×n times, in the upsampling procedure with the muxer layer, information of respective feature images in the input signal is recorded in the generated feature image(s) without loss; and thus, every time when the image passes through a muxer layer with an upsampling multiple of n, the image resolution can be increased by n×n times.

20 Claims, 3 Drawing Sheets

(51) Int. Cl.
*G06N 3/08* (2006.01)
*G06K 9/62* (2006.01)
*G06T 3/40* (2006.01)

(56) References Cited

U.S. PATENT DOCUMENTS

| | | | | |
|---|---|---|---|---|
| 5,471,627 | A * | 11/1995 | Means | G06K 9/56 382/279 |
| 7,028,271 | B2 * | 4/2006 | Matsugu | G06K 9/00281 382/181 |
| 7,187,811 | B2 * | 3/2007 | Lin | G06T 3/4007 382/299 |
| 7,991,719 | B2 * | 8/2011 | Ishii | G06K 9/4628 706/28 |
| 2004/0103095 | A1 * | 5/2004 | Matsugu | G06K 9/00281 |
| 2017/0103298 | A1 * | 4/2017 | Ling | G06N 3/04 |
| 2017/0103299 | A1 * | 4/2017 | Aydonat | G06N 3/04 |
| 2018/0032857 | A1 * | 2/2018 | Lele | G06N 3/04 |
| 2018/0046916 | A1 * | 2/2018 | Dally | G06N 3/08 |
| 2018/0096226 | A1 * | 4/2018 | Aliabadi | G06K 9/6219 |

OTHER PUBLICATIONS

Written Opinion of International Searching Authority for PCT/CN2016/075338 in Chinese, dated May 19, 2016 with English translation.
Liu Na and Li Cuihua, "Single Image Super-Resolution Reconstruction via Deep Convolutional Neural Network," Chinese Science Paper, vol. 10 No. 2, Jan. 31, 2015, pp. 201-2016.
Chao Dong, Chen Change Loy, Kaiming He, and Xiaoou Tang, "Learning a Deep Convolutional Network for Image Super-Resolution," Computer Version-ECCV 2014, 13th European Conference, Zurich, Switzerland, Sep. 6-12, 2014, Proceedings, Part IV, Sep. 12, 2014, pp. 1-14.
Ding Liu, Zhaowen Wang, and Thomas Huang, "Efficient Image and Video Super-Resolution Using Deep Convolutional Neural Networks," GPU Technology Conference—Illinois Department of Electrical and Computer Engineering.

* cited by examiner

IMAGE UPSAMPLING SYSTEM, TRAINING METHOD THEREOF AND IMAGE UPSAMPLING METHOD

CROSS REFERENCE TO RELATED APPLICATIONS

This application is the National Stage of PCT/CN2016/075338 filed on Mar. 2, 2016, which claims priority under 35 U.S.C. § 119 of Chinese Application No. 201510595656.7 filed on Sep. 17, 2015, the disclosure of which is incorporated by reference.

TECHNICAL FIELD

The present disclosure relates to an image signal processing technology, and more particularly, to an image upsampling system, a training method thereof, and an image upsampling method.

BACKGROUND

Figure 1:
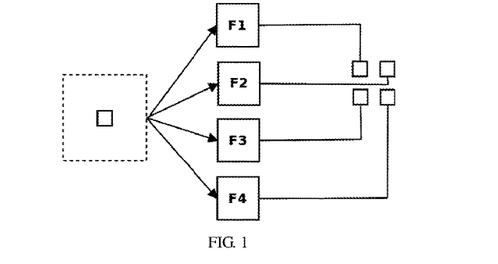
FIG. 1 is a schematic diagram of a 2× upsampling in the state of art.

At present, in an image signal processing procedure, generally, the resolution of an image can be raised by means of the standard methods such as a bicubic upsampling process and a linear upsampling process (for enlarging image resolution). As illustrated in FIG. 1, a 2× upsampling mode is shown, four different filters: filter F1, filter F2, filter F3 and filter F4, are applied to all the pixels (plus adjacent pixels) of an input image, each filter generates a quarter of the pixels of the output image, and the process may be understood as applying four filters (convolution) to the input image, and then interleaving or multiplexing to create a single output image that doubles the width and the height of the image.

However, data computation amount of the current image upsampling system is relatively large, and the upsampling multiple (times) cannot be flexibly adjusted.

SUMMARY

In view of the above, embodiments of the present disclosure provide an image upsampling system, a training method thereof and an image upsampling method, for implementing high-quality upsampling of image resolution based on a convolutional neural network, to reduce a computation amount of upsampling, and to improve flexibility of adjusting the upsampling multiple.

An aspect of the present disclosure provides an image upsampling system, comprising: at least one first convolutional network and at least one muxer layer that are cascaded; an signal input end of the image upsampling system is connected with a signal input end of a first convolutional network in the at least one first convolutional network, and a signal output end of the image upsampling system is connected with a signal output end of a last muxer layer in the at least one muxer layer; a signal input end of every muxer layer in the at least one muxer layer is connected with a signal output end of a first convolutional network located in a stage prior to the muxer layer in the at least one first convolutional network, or connected with a signal output end of another muxer layer located in a stage prior to the muxer layer in the at least one muxer layer; the first convolutional network is configured for converting an image input to its signal input end into a plurality of feature images and outputting the feature images to the signal input end of the muxer layer connected therewith; the muxer layer is configured for synthesizing every n×n feature images in the feature images input to its signal input end into a feature image whose resolution is n×n times that of the input feature image and outputting the same; and a number of feature images input to the muxer layer is a multiple of n×n, n being an integer greater than one.

According to an embodiment of the present disclosure, a number of muxer layers is two or three.

According to an embodiment of the present disclosure, a signal input end of each muxer layer is respectively connected with a signal output end of one corresponding first convolutional network in the at least one first convolutional network.

According to an embodiment of the present disclosure, in the case where there are provided a plurality of muxer layers, the muxer layers have a same upsampling multiple.

According to an embodiment of the present disclosure, the muxer layer has an upsampling multiple which is a prime number.

According to an embodiment of the present disclosure, the muxer layer has an upsampling multiple which is 2.

According to an embodiment of the present disclosure, the muxer layer is a self-adaptive interpolation filter.

According to an embodiment of the present disclosure, the image upsampling system further comprises: a second convolutional network, whose signal input end is connected with a signal output end of the last muxer layer in the at least one muxer layer, and whose signal output end is connected with the signal output end of the image upsampling system; the second convolutional network is configured for optimizing picture quality of the feature images output by the muxer layer.

According to an embodiment of the present disclosure, the first convolutional network and the second convolutional network include at least one convolution layer composed of a plurality of filter units.

Another aspect of the present disclosure further provides a display device, comprising any one of the above image upsampling systems.

Still another aspect of the present disclosure further provides a training method of any of one the image upsampling systems, comprising: initializing respective parameters in the image upsampling system; by using an original image signal as an output signal of the image upsampling system and using an image signal obtained by down-sampling the original image signal as an input signal of the image upsampling system, adjusting the respective parameters in the image upsampling system to allow the down-sampled image signal subjected to upsampling processing with the adjusted respective parameters to be the same as the original image signal.

According to an embodiment of the present disclosure, in the above training method, initializing of the respective parameters in the image upsampling system includes: initializing weights Wij of respective filter units of respective convolution layers of the first convolutional network and the second convolutional network in the image upsampling system according to a formula below:

$$W_{ij} = \begin{cases} 1/(m) & (i, j) \text{ are preset anchor pixel} \\ 0 & \text{other pixel} \end{cases}$$

where m represents the number of feature images input to the filter unit; and initializing the biases of respective filter units to 0.

According to an embodiment of the present disclosure, in the above training method, initializing of the respective parameters in the image upsampling system includes: initializing the weights Wij of respective filter units of respective convolution layers of the first convolutional network and the second convolutional network in the image upsampling system according to a formula below:

$$W_{ij} = W'_{ij} + \frac{\text{uniform}(-1, 1)}{\sqrt{m}}$$

$$W'_{ij} = \begin{cases} 1/(m) & (i, j) \text{ are preset anchor pixel} \\ 0 & \text{other pixel} \end{cases}$$

where m represents the number of feature images input to the filter unit, and uniform (−1, 1) represents a random number selected between (−1, 1); and initializing the biases of respective filter units to 0.

Further still another aspect of the present disclosure further provides a, method for performing image upsampling with any one of the above image upsampling systems, comprising: converting, by a first convolutional network, an input image input to the first convolutional network into a plurality of feature images and outputting the feature images; synthesizing, by a muxer layer, every n×n feature images in the feature images input to the muxer layer into a feature image with a resolution amplified by n×n times as larger as the input feature images, and outputting the same; the number of feature images input to the muxer layer being a multiple of n×n, and n being an integer greater than 1.

According to the embodiments of the present disclosure, in the image upsampling system, the training method thereof and the image upsampling method, a feature images of an image are obtained by a convolutional network, upsampling processing is performed on the image with a muxer layer to synthesize every n×n feature images in an input signal into a feature image with the resolution amplified by n×n times; in the upsampling procedure with the muxer layer, information of respective input feature images is recorded in the generated feature image without loss; and thus, every time when the image passes through a muxer layer which can upsample by a multiple of nx, the image resolution can be increased by n×n times. In addition, in the image upsampling system, more than one muxer layers can be provided for successive processes of upsampling, each muxer layer can execute an upsampling function of a single multiple, so that the system can flexibly adjust the upsampling multiple(s) according to needs, implement a universal upsampling system with respect to different upsampling multiples. Further, because the number of feature images output by each muxer layer is reduced while the muxer layer amplifies the resolution of the feature image(s) by n×n times, an signal amount input to a muxer layer or a first convolutional network of a next cascaded stage can be reduced so as to simplify the computation amount of upsampling.

DETAILED DESCRIPTION

A convolutional neural network is a type of artificial neural network, and has become a research hotspot in the fields such as speech analysis and image recognition at present. The weight sharing network structure of a convolutional neural network renders the convolutional neural network more similar to a biological neural network, and it can reduce the complexity of a network model and reduces the number of weights. This advantage is more obvious when the input of the network is a multi-dimensional image, and the image can be directly used as the network input, which avoids the complicated process such as feature extraction and data reconstruction in a traditional identification algorithm. The convolutional neural network is a multi-layer sensor specially designed to identify a two-dimensional shape. This type of network structure can be applied to translation, scaling, tilting, or other forms of transformation.

Based on a convolutional neural network, an embodiment of the present disclosure provides an image upsampling system, a method for training the image upsampling system, and a method for performing upsampling on an input image according to the trained image upsampling system. The image upsampling system performs upsampling by using the convolutional neural network, and, under the premise of ensuring substantially no loss of image information, can effectively converts a low-resolution image into a high-resolution image.

Hereinafter, specific implementing modes of the image upsampling system, the training method thereof and the image upsampling method provided by the embodiments of the present disclosure will be described in detail in connection with the drawings.

An image upsampling system provided by an embodiment of the present disclosure, as illustrated in FIG. 2a to FIG. 2d, comprises: at least one first convolutional network (CN) and at least one muxer layer (ML) cascaded; an signal input end of the image upsampling system is connected with a signal input end of one first convolutional network, and a signal output end of the image upsampling system is connected with a signal output end of one muxer layer.

A signal input end of a muxer layer is connected with a signal output end of one first convolutional network or connected with a signal output end of another muxer layer.

The first convolutional network is configured for converting an image input to its signal input end into a plurality of feature images and outputting to the signal input end of the muxer layer. The muxer layer is configured for synthesizing every n×n feature images in the feature images that are input to its signal input end into a feature image whose resolution is n×n times the resolution of the input feature images, and outputting the synthesized feature image; and the number of feature images input to the muxer layer is a multiple of n×n, where n is an integer greater than one.

In the above-described image upsampling system provided by the embodiment of the present disclosure, image upsampling processing is performed with a muxer layer to synthesize every n×n feature images input to the muxer layer into one feature image with the resolution amplified by n×n times, and in the upsampling procedure with the muxer layer, the information of each input feature image is still recorded in the resultant feature image without loss; and thus, every time when the image passes through a muxer layer with an upsampling multiple (factor) of n, the image resolution can be increased by n×n times. In addition, in the image upsampling system, more than one muxer layers may be provided for successively upsampling, the muxer layers can respectively perform an upsampling function of an individual multiple, so that the system can flexibly adjust the upsampling multiple(s) according to needs and realize a universal image upsampling system with respect to different upsampling multiples. Further, because the number of feature images output by each muxer layer is reduced while the muxer layer amplifies the resolution of the feature image by n×n times, the signals amount input to the muxer layer or first convolutional network in a next cascaded stage can be reduced so as to alleviate the computation amount of upsampling.

It should be noted that, if the system comprises a plurality of muxer layers with an amplifying multiple of n times, then after the image is upsampled by the system, the image resolution can be improved by (n×n)×(n×n) times.

For example, if the system comprises two muxer layers with an upsampling multiple of 2× (two times), after the image passes through the two muxer layers, the resolution is improved by 4×4 times; and if the system comprises three muxer layers with an upsampling multiple of 2×, after the image passes through the three muxer layers, the resolution is improved by 4×4×4 times.

When specifically implemented, according to the required upsampling multiple, there may be provided a variety of specific implementing modes of the above-described image upsampling system provided by the embodiment of the present disclosure. For example, according to the required upsampling multiple, in the above-described image upsampling system provided by the embodiment of the present disclosure, one muxer layer may be provided as illustrated in FIG. 2a, or two muxer layers may be provided as illustrated in FIG. 2b and FIG. 2c, or three muxer layers may be provided as illustrated in FIG. 2d.

Figure 2A:
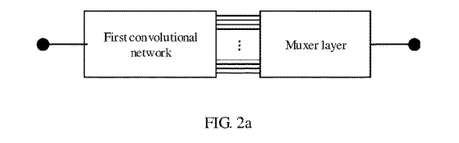
FIG. 2a to FIG. 2e are respectively structural schematic diagrams of an image upsampling system provided by an embodiment of the present disclosure.
Figure 2B:
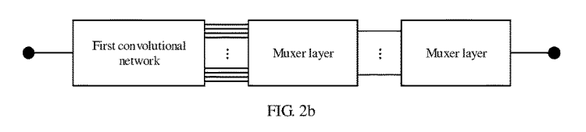

Specifically, generally, when an upsampling process by an upsampling multiple such as 2×, 3× or 5× is needed, the above-described image upsampling system provided by an embodiment of the present disclosure, as illustrated in FIG. 2a, comprises one first convolutional network and one muxer layer which can upsample feature images by times of 2×, 3× or 5×. When an upsampling multiple of 4× is needed, the above-described image upsampling system provided by the embodiment of the present disclosure, as illustrated in FIG. 2b and FIG. 2c, may comprise two muxer layers which can upsample by 2× times. When an upsampling multiple of 8× is needed, the above-described image upsampling system provided by the embodiment of the present disclosure, as illustrated in FIG. 2d, may comprise three muxer layers which can upsample by 2× times. In this way, the greater the required multiple, the larger the number of muxer layers correspondingly, and the greater the data computation amount performed by the corresponding system. Thus, preferably, in the above-described image upsampling system provided by the embodiment of the present disclosure, two or three muxer layers are generally provided, to perform two or three processes of upsampling.

Figure 2C:
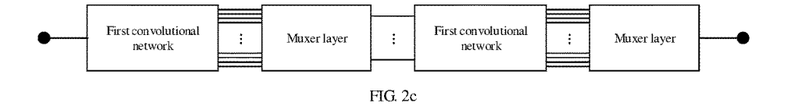
Figure 2D:
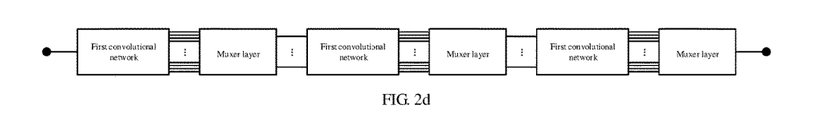

Further, when a plurality of muxer layers are provided in the above-described image upsampling system provided by the embodiment of the present disclosure, in order that when each muxer layer performs upsampling, high-quality feature images can be synthesized into a high-quality feature image whose resolution is n×n times the resolution of the input feature images, as illustrated in FIG. 2c and FIG. 2d, generally, the signal input end of the muxer layer is connected with the signal output end of the first convolutional network, and thus firstly, the feature images are obtained by the first convolutional network, then the obtained feature images are input to the signal input end of the corresponding muxer layer, that is, in the image upsampling system, the first convolutional network and the muxer layer are arranged in pair(s).

Further, in the case where a plurality of muxer layers are provided in the above-described image upsampling system provided by an embodiment of the present disclosure, the upsampling multiples of the muxer layers may be the same or different from each other. Usually, when there are provided a plurality of muxer layers, the upsampling multiple n of the respective muxer layer is generally elected to be the same. Moreover, the smaller the upsampling multiple of each muxer layer, the smaller the computation amount, and the better the upsampling effect. Thus, when the required upsampling multiple is larger, generally upsampling is performed many times, and the upsampling multiple n of each muxer layer is generally elected to be a prime number such as 2, 3, 5 or 7. Preferably, the upsampling multiple n of each muxer layer is set to be 2.

Figure 2E:
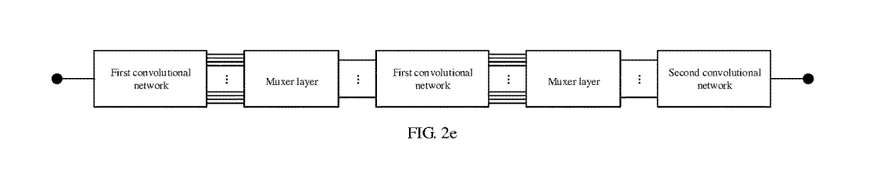

Further, the above-described image upsampling system provided by an embodiment of the present disclosure, as illustrated in FIG. 2e, further comprises: a second convolutional network, whose signal input end is connected with the signal output end of an muxer layer, and whose signal output end is connected with the signal output end of the image upsampling system; the second convolutional network is configured for optimizing the picture quality of the feature image output by a muxer layer. Before the muxer layer of the last stage outputs a finally upsampled feature image, the second convolutional network can be configured for enhancing the picture quality of output picture according to actual needs, to improve quality of the output image.

Specifically, in the above-described image upsampling system provided by an embodiment of the present disclosure, both the first convolutional network and the second convolutional network may include at least one convolution layer composed of a plurality of filter units. The number of convolution layers included in the first convolutional network and the second convolutional network may be set according to needs. And the number of filter units included in each convolution layer may be the same or different. Generally, in order to facilitate the system to optimize its parameter(s), the number of convolution layers in each convolutional network is generally set to be no more than 10.

Hereinafter, the above-described image upsampling system provided by an embodiment of the present disclosure will be described below with reference to the structure shown in FIG. 2e, and with a case where two 2× muxer layers are configured for performing 4× upsampling as an example.

Specifically, the first convolutional network at the first stage is connected with the signal input end of the image upsampling system and is composed of four convolution layers, each convolution layer includes 128 filter units, and each filter unit is composed of 3×3 filters; the filter at position [1,1] is set as the center pixel. After the input image passes through the first convolution layer, 128 feature images are generated and output to a next convolution layer, until the last convolution layer outputs 128 feature images to the muxer layer of a next (second) stage.

After the muxer layer of the second stage receives the 128 feature images output by the first convolutional network of the first stage, it synthesizes every four input feature images into one feature image of the pixel resolution 4 times as larger as the input feature images (2× upsampling), i.e., after the 128 input feature images pass through the muxer layer of the second stage, 32 feature images are output to the first convolutional network of the next (third) stage.

The first convolutional network of the third stage is composed of four convolution layers, each convolution layer includes 32 filter units, and each filter unit is composed of 3×3 filters; the filter at position [1,1] is set as the center pixel. After the 32 feature images input from the muxer layer of the second stage pass through the first convolution layer, 32 feature images are generated and output to a next convolution layer, until the last convolution layer outputs 32 feature images to the muxer layer of the next (fourth) stage.

After the muxer layer of the fourth stage receives the 32 feature images output by the first convolutional network of the third stage, it synthesizes every 4 input feature images into one feature image of pixel resolution of 4 times as larger as the input feature images (2× upsampling), i.e., after the 32 input feature images pass through the fourth stage of muxer layer, 8 feature images are output to the second convolutional network of the next (fifth) stage.

The second convolutional network of the fifth stage is composed of four convolution layers, the first two convolution layers include 8 filter units, the third convolution layer includes 4 filter units, the fourth convolution layer includes 1 filter unit, and each filter unit is composed of 3×3 filters; the filter at position [1,1] is set as the center pixel. After the image of the input signal passes through the first convolution layer, 8 feature images are generated and output to the second convolution layer, after they pass through the second convolution layer, 8 feature images are generated and input to the third convolution layer, after they pass through the third convolution layer, 4 feature images are input to the fourth convolution layer, and finally, the fourth convolution layer outputs one feature image to the output end of the image upsampling system.

Figure 3:
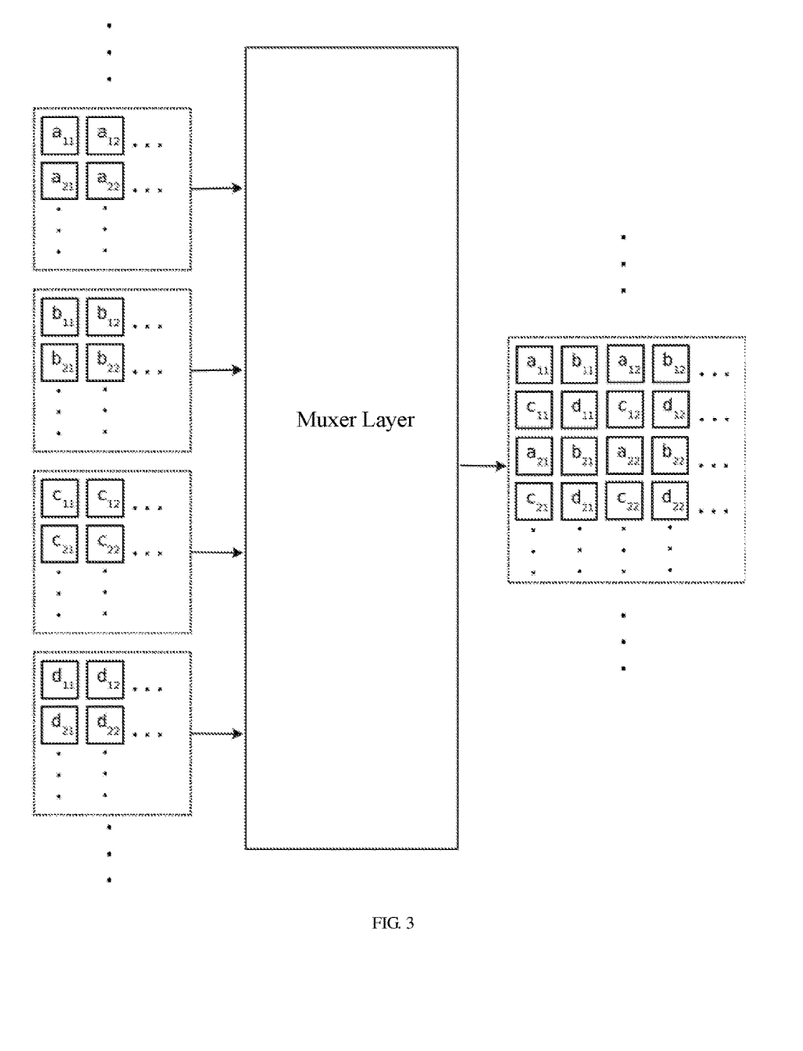
FIG. 3 is a schematic diagram of upsampling by a muxer layer in an image upsampling system provided by an embodiment of the present disclosure.

In the above-described procedure, each muxer layer is substantially equivalent to a self-adaptive interpolation filter, and as illustrated in FIG. 3, pixel values of every four feature images in the input feature image are combined in a staggered manner, to generate a feature image of a quadrupling pixel. As illustrated in FIG. 3, a working principle of the muxer layer is arranging pixel values of respective identical pixel-point positions in 4 input feature image in a matrix in an output feature image, so that in the upsampling procedure, no pixel information in the feature image will be modified (lost or added).

In the above-described procedure, either the first convolutional network or the second convolutional network can be a neural network structure which uses images as input and output, each neural network structure includes a plurality of convolution layers, and each convolution layer is composed of a plurality of filters. Hereinafter, the working principle will be briefly introduced by means of a neural network structure of two convolution layers in FIG. 4 as an example.

Figure 4:
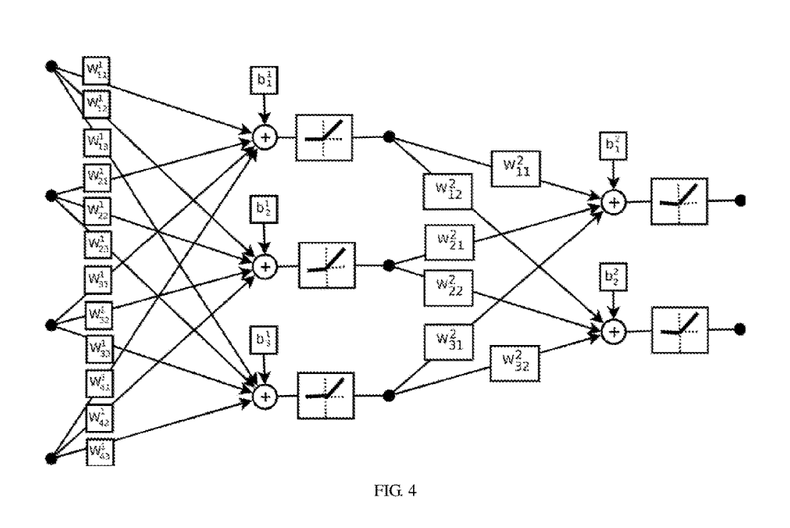
FIG. 4 is a structural schematic diagram of a convolutional network in an image upsampling system provided by an embodiment of the present disclosure.

On the left side of FIG. 4, there are four input images, which generate three feature images after passing through respective filters of the first convolution layer, generate two feature images after passing through respective filters of the second convolution layer and then are output. Therein, each box marked with a scalar weight $W_{ij}^k$ is equivalent to a filter (for example, a filter having 3×3 or 5×5 core), and a bias $b_j^k$ represents picture increment added to convolution output; k represents the serial number of the convolution layer, and i and j represent an input serial image number and an output image serial number, respectively.

Figure 5:
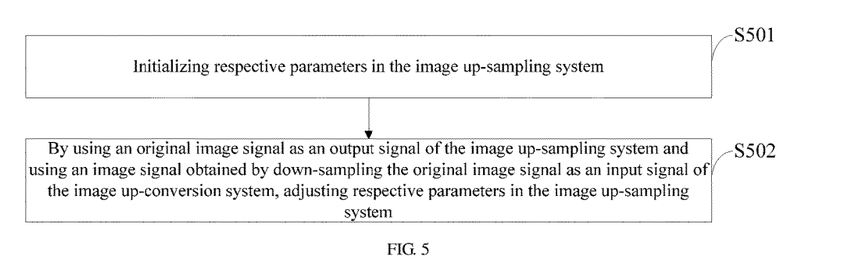
FIG. 5 is a schematic flow chart of a training method of an image upsampling system provided by an embodiment of the present disclosure.

In the process of a system operation, the numerical values of the scalar weight $W_{ij}^k$ and the bias $b_j^k$ are relatively fixed, and before the system operation, it is necessary to train the system by using a series of standard input and output images, and depend on an application to adjust to adapt to some optimization criteria. Therefore, before operation of the above-described image upsampling system provided by an embodiment of the present disclosure, a series of training needs to be performed; and based on a same inventive concept, an embodiment of the present disclosure further provides a training method of the above-described image upsampling system, as illustrated in FIG. 5, comprising the following operations:

S501: initializing respective parameters in the image upsampling system; because a muxer layer does not introduce any parameter, the respective parameters in the image upsampling system are actually the parameters of all convolutional networks.

S502: using an original image signal as an output signal of the image upsampling system, using an image signal obtained by down-sampling the original image signal as an input signal of the image upsampling system, and adjusting respective parameters in the image upsampling system to allow the result from the down-sampled image signal subjected to upsampling processing with the adjusted respective parameters to be the same as the original image signal. Thereafter, the adjusted respective parameters are used as the upsampling parameter of the upsampling system, to up-sample the low-resolution image.

In step S501, with respect to the initializing respective parameters in the image upsampling system, a traditional initializing mode may be used, and weights Wij of respective filter units of the respective convolution layers of all the convolutional networks are set to be a small random numbers, and all the biases are initialized to be 0. The traditional initializing way will not invoke any problem when applied to small-multiple (such as 2×) upsampling, but may invoke some problems when applied to high-multiple (such as 4×) upsampling in connection with several convolutional networks, and thus, the above-described training method provided by an embodiment of the present disclosure further provides two new ways with respect to the initializing respective parameters in the image upsampling system, specifically as follows:

First way: initializing biases of respective filter units to be zero (0); and initializing weights Wij of respective filter units of respective convolution layers of the first convolutional network and the second convolutional network in the image upsampling system according to a formula below:

$$W_{ij} = \begin{cases} 1/(m) & (i, j) \text{ are preset anchor pixel} \\ 0 & \text{other pixel} \end{cases}$$

where m represents the number of feature images input to the filter unit.

Second way: initializing the biases of respective filter units to be 0; and initializing the weights Wij of respective filter units of respective convolution layers of the first convolutional network and the second convolutional network in the image upsampling system according to a formula below:

$$W_{ij} = W'_{ij} + \frac{\text{uniform}(-1, 1)}{\sqrt{m}};$$

$$W'_{ij} = \begin{cases} 1/(m) & (i, j) \text{ are preset anchor pixel} \\ 0 & \text{other pixel} \end{cases}$$

where m represents the number of feature images input to the filter unit; and uniform (−1, 1) represents a random number selected between (−1, 1).

In the second initializing way, as compared with the first initializing way, a small uniformly distributed noise value is added to the weights $W_{ij}$ of respective filter units, which facilitates the image upsampling system to have an ability of identifying noise after training.

Based on the same inventive concept, an embodiment of the present disclosure further provides a method for performing image upsampling with the above-described image upsampling system; because the principle for the method to solve the problem is similar to that of an image upsampling system as described above, for implementation of the method, the implementation of the system may be referred to, and will not be repeated here.

An embodiment of the present disclosure provides a method for performing image upsampling with an image upsampling system, comprising: converting, by a first convolutional network, an input image input to the first convolutional network into a plurality of feature images having a specific feature and outputting the same; and synthesizing, by a muxer layer, every n×n feature images in the feature images input to the muxer layer into a feature image with the resolution amplified by n×n times as larger as the resolution of the input feature images, and outputting the same, wherein the number of feature images input to the muxer layer is a multiple of n×n, and n is an integer greater than 1.

Specifically, in the case where there are provided a plurality of muxer layers in the system, each muxer layer, after receiving the feature images, will perform upsampling processing on the feature images, and output the result to a next muxer layer, the next muxer layer performs upsampling processing on the received feature image(s), until the last muxer layer outputs a final up-sampled image.

The image upsampling system as described in the embodiment of the present disclosure may be implemented by a set of central processing units (CPU), and may also be implemented by a set of graphics processing unit (GPU), or may also be implemented by a field programmable gate array (FPGA).

Based on a same inventive concept, an embodiment of the present disclosure further provides a display device, comprising the above-described image upsampling system provided by the embodiment of the present disclosure; the display device can be: a mobile phone, a tablet computer, a television, a monitor, a laptop computer, a digital photo frame, a wearable device, a navigator and any products or parts with a display function. For implementation of the display device, the embodiment of the above-described image upsampling system may be referred to, and will not be repeated here.

In the image upsampling system, the training method thereof and the image upsampling method provided by some embodiments of the present disclosure, the feature images of an image are obtained by using the convolutional network, upsampling processing is performed on the images with the muxer layer to synthesize every n×n feature images in the input signal into a feature image with the resolution amplified by n×n times, in the upsampling procedure with the muxer layer, information of respective feature images in the input signal is recorded in the generated feature image(s) without loss; and thus, every time when the image passes through a muxer layer with an upsampling multiple of n, the image resolution can be increased by n×n times. In addition, in the image upsampling system, more than one muxer layer may be provided for successive processes of upsampling, each muxer layer can execute an upsampling function of a single multiple so that the system may flexibly adjust the upsampling multiple according to needs, and implement a universal upsampling system for different upsampling multiples. Further, because the number of feature images output by each muxer layer is reduced while the muxer layer amplifies the resolution of the feature images by n×n times, the signal amount input to the muxer layer or first convolutional network of a next cascaded stage can be reduced so as to simplify the computation amount of upsampling.

It is evident that one person skilled in the art can make various changes or modifications to the present invention without departure from the spirit and scope of the invention. Thus, if such changes and modifications to the present disclosure are within the scope of the claims of the present disclosure and equivalent thereof, the present disclosure also intends to include all such changes and modifications within its scope.

This application claims priority of Chinese Patent Application No. 201510595656.7 filed on Sep. 17, 2015, entitled "IMAGE UPSAMPLING SYSTEM, TRAINING METHOD THEREOF AND IMAGE UPSAMPLING METHOD", the disclosure of which is incorporated herein by reference in its entirety as part of the present application.

What is claimed is:

1. An image upsampling system, comprising:
   at least one first convolutional network and at least one muxer layer that are cascaded;
   wherein an signal input end of the image upsampling system is connected with a signal input end of a first convolutional network in the at least one first convolutional network, and a signal output end of the image upsampling system is connected with a signal output end of a last muxer layer in the at least one muxer layer;
   a signal input end of every muxer layer in the at least one muxer layer is connected with a signal output end of a first convolutional network located in a stage prior to the muxer layer in the at least one first convolutional network, or connected with a signal output end of another muxer layer located in a stage prior to the muxer layer in the at least one muxer layer;
   the first convolutional network is configured for converting an image input to its signal input end into a plurality of feature images and outputting the feature images to the signal input end of the muxer layer connected therewith;
   the muxer layer is configured for synthesizing every n×n feature images in the feature images input to its signal input end into a feature image whose resolution is n×n times that of the input feature image and outputting the same; and a number of feature images input to the muxer layer is a multiple of n×n, n being an integer greater than one.

2. The image upsampling system according to claim 1, wherein a number of muxer layers is two or three.

3. The image upsampling system according to claim 2, further comprising:

a second convolutional network, whose signal input end is connected with a signal output end of the last muxer layer in the at least one muxer layer, and whose signal output end is connected with the signal output end of the image upsampling system;

wherein the second convolutional network is configured for optimizing picture quality of the feature images output by the muxer layer.

4. The image upsampling system according to claim 3, wherein, the first convolutional network and the second convolutional network include at least one convolution layer composed of a plurality of filter units.

5. The image upsampling system according to claim 1, wherein, a signal input end of each muxer layer is respectively connected with a signal output end of one corresponding first convolutional network in the at least one first convolutional network.

6. The image upsampling system according to claim 5, further comprising:

a second convolutional network, whose signal input end is connected with a signal output end of the last muxer layer in the at least one muxer layer, and whose signal output end is connected with the signal output end of the image upsampling system;

wherein the second convolutional network is configured for optimizing picture quality of the feature images output by the muxer layer.

7. The image upsampling system according to claim 6, wherein, the first convolutional network and the second convolutional network include at least one convolution layer composed of a plurality of filter units.

8. The image upsampling system according to claim 1, wherein, in the case where there are provided a plurality of muxer layers, the muxer layers have a same upsampling multiple.

9. The image upsampling system according to claim 8, further comprising:

a second convolutional network, whose signal input end is connected with a signal output end of the last muxer layer in the at least one muxer layer, and whose signal output end is connected with the signal output end of the image upsampling system;

wherein the second convolutional network is configured for optimizing picture quality of the feature images output by the muxer layer.

10. The image upsampling system according to claim 9, wherein, the first convolutional network and the second convolutional network include at least one convolution layer composed of a plurality of filter units.

11. The image upsampling system according to claim 1, wherein, the muxer layer has an upsampling multiple which is a prime number.

12. The image upsampling system according to claim 11, wherein, the muxer layer has an upsampling multiple which is 2.

13. The image upsampling system according to claim 1, wherein, the muxer layer is a self-adaptive interpolation filter.

14. The image upsampling system according to claim 1, further comprising:

a second convolutional network, whose signal input end is connected with a signal output end of the last muxer layer in the at least one muxer layer, and whose signal output end is connected with the signal output end of the image upsampling system;

wherein the second convolutional network is configured for optimizing picture quality of the feature images output by the muxer layer.

15. The image upsampling system according to claim 14, wherein, the first convolutional network and the second convolutional network include at least one convolution layer composed of a plurality of filter units.

16. A display device, comprising the image upsampling system according to claim 1.

17. A training method of the image upsampling system according to claim 1, comprising:

initializing respective parameters in the image upsampling system;

by using an original image signal as an output signal of the image upsampling system and using an image signal obtained by down-sampling the original image signal as an input signal of the image upsampling system, adjusting the respective parameters in the image upsampling system to allow the down-sampled image signal subjected to upsampling processing with the adjusted respective parameters to be the same as the original image signal.

18. The training method according to claim 17, wherein, initializing of the respective parameters in the image upsampling system includes:

initializing weights $W_{ij}$ of respective filter units of respective convolution layers of the first convolutional network and the second convolutional network in the image upsampling system according to a formula below:

$$W_{ij} = \begin{cases} 1/(m) & (i, j) \text{ are preset anchor pixel} \\ 0 & \text{other pixel} \end{cases}$$

where m represents the number of feature images input to the filter unit; and initializing the biases of respective filter units to 0.

19. The training method according to claim 17, wherein, initializing of respective parameters in the image upsampling system includes:

initializing the weights $W_{ij}$ of respective filter units of respective convolution layers of the first convolutional network and the second convolutional network in the image upsampling system according to a formula below:

$$W_{ij} = W'_{ij} + \frac{\text{uniform}(-1, 1)}{\sqrt{m}};$$

$$W'_{ij} = \begin{cases} 1/(m) & (i, j) \text{ are preset anchor pixel} \\ 0 & \text{other pixel} \end{cases}$$

where m represents the number of feature images input to the filter unit, and uniform (−1, 1) represents a random number selected between (−1, 1); and initializing the biases of respective filter units to 0.

20. A method for performing image upsampling with the image upsampling system according to claim 1, comprising:

converting, by a first convolutional network, an input image input to the first convolutional network into a plurality of feature images and outputting the feature images;

synthesizing, by a muxer layer, every n×n feature images in the feature images input to the muxer layer into a feature image with a resolution amplified by n×n times as larger as the input feature images, and outputting the same; the number of feature images input to the muxer layer being a multiple of n×n, and n being an integer greater than 1.

* * * * *